United States Patent
Nakamura

(10) Patent No.: US 8,351,610 B2
(45) Date of Patent: Jan. 8, 2013

(54) COMMUNICATION SYSTEM AND COMMUNICATION METHOD

(75) Inventor: Takatoshi Nakamura, Yokkaichi (JP)

(73) Assignee: N-Crypt, Inc., Yokkaichi-shi, Mie (JP)

( * ) Notice: Subject to any disclaimer, the term of this patent is extended or adjusted under 35 U.S.C. 154(b) by 914 days.

(21) Appl. No.: 11/813,155

(22) PCT Filed: Jan. 4, 2006

(86) PCT No.: PCT/JP2006/000158
§ 371 (c)(1),
(2), (4) Date: Aug. 13, 2009

(87) PCT Pub. No.: WO2006/073200
PCT Pub. Date: Jul. 13, 2006

(65) Prior Publication Data
US 2009/0304183 A1    Dec. 10, 2009

(30) Foreign Application Priority Data
Jan. 7, 2005    (JP) .................................. 2005 003259

(51) Int. Cl.
*H04L 9/08* (2006.01)
(52) U.S. Cl. ......... 380/281; 380/284; 380/255; 713/160
(58) Field of Classification Search .................. 380/281, 380/284, 255; 713/160
See application file for complete search history.

(56) References Cited

U.S. PATENT DOCUMENTS

| 6,259,789 B1* | 7/2001 | Paone | 380/28 |
| 7,382,878 B2* | 6/2008 | Volpert, Jr. | 380/37 |
| 2009/0141889 A1* | 6/2009 | Nakamura | 380/44 |
| 2009/0154693 A1* | 6/2009 | Nakamura | 380/30 |
| 2010/0061550 A1* | 3/2010 | Nakamura | 380/44 |

FOREIGN PATENT DOCUMENTS
JP    06-216897    8/1994

OTHER PUBLICATIONS
International Search Report dated Mar. 28, 2006.
English Language Abstract of JP-06-216897.

* cited by examiner

*Primary Examiner* — Krisna Lim
(74) *Attorney, Agent, or Firm* — Michael D. Bednarek; Axinn Veltrop & Harkrider LLP

(57) ABSTRACT

To improve a communication system including two communication apparatuses so as to reduce a possibility of having communication decrypted by a third party. The communication system includes a first communication apparatus and a second communication apparatus, where one of the communication apparatuses encrypts transmission subject data and transmits generated encrypted data to the other communication apparatus which decrypts received encrypted data. Each of the communication apparatuses generates an algorithm used for encryption each time it performs the encryption or decryption. In this case, each of the communication apparatuses generates the algorithm by assigning past solutions to a solution generating algorithm capable of having the past solutions assigned thereto and thereby generating a new algorithm. The past solutions are erased when they are no longer used.

9 Claims, 6 Drawing Sheets

COMMUNICATION SYSTEM AND COMMUNICATION METHOD

TECHNICAL FIELD

The present invention relates to a communication system including two communication apparatuses capable of encrypting transmission subject data in plain text to render it as encrypted data and then transmitting it to the communication apparatus at the other end and also decrypting received encrypted data and rendering it as the transmission subject data.

BACKGROUND OF THE INVENTION

The above-mentioned communication system is used in a situation where it is necessary to keep transmission subject data transmitted between two communication apparatuses confidential to a third party. Although various encryption techniques are proposed and used in order to keep the transmission subject data confidential, it is difficult to completely prevent decryption of a code.

In general, communication performed by encrypting the transmission subject data is performed by using a procedure of cutting the transmission subject data by a predetermined number of bits on a transmitting and receiving apparatus on a transmitter side, encrypting each piece of the cut data and transmitting it to the communication apparatus at the other end and decrypting received data on the transmitting and receiving apparatus on a receiver side.

In the case of performing such encryption, an algorithm and a key which are predetermined are generally used. This algorithm is rendered very complicated to prevent the decryption of the code, and the key is also changed in predetermined timing in many cases. Once the algorithm and key are known, however, it is relatively easy to break the encrypted data by using the algorithm and key even if the algorithm is rendered complicated or the key is changed.

The inventors hereof studied encryption technology for many years and previously invented a technique for performing encrypted communication wherein each of the communication apparatuses on the transmitting side and the receiving side is provided with common means for successively generating at least one of the algorithm and key for performing the encryption and decryption so as to perform the encrypted communication while successively changing at least one of the algorithm and key used for the encryption and decryption.

This technique successively generates at least one of the algorithm and key for performing the encryption and decryption. Even in the case where the algorithm or the key is known once, the algorithm or the key or both of them change thereafter. Therefore, strength thereof is much higher than conventional encryption technology.

As for this technique, however, there are the cases where, if some of the past algorithms or keys are known, it is predictable as to how the algorithm or the key or both of them change from now on. Thus, a possibility of being broken by a third party is not absolutely zero.

An object of the present invention is to improve the communication system including two communication apparatuses capable of encrypting transmission subject data in plain text to render it as encrypted data and then transmitting it to the communication apparatus at the other end and also decrypting received encrypted data and rendering it as the transmission subject data so as to reduce the possibility of being broken by a third party.

DISCLOSURE OF THE INVENTION

To achieve the object, the inventors hereof propose a first invention and a second invention described below.

The first invention of the present application is as follows.

The first invention is a communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data.

Both the first communication apparatus and the second communication apparatus of the communication system comprise: cutting means for cutting the transmission subject data by a predetermined number of bits into multiple pieces of transmission subject cut data, and also cutting the encrypted data by the same number of bits by which the encrypted data is cut when encrypted into multiple pieces of encrypted cut data; algorithm generating means for sequentially generating algorithms rendered common between the first communication apparatus and the second communication apparatus; encrypting and decrypting means for encrypting the transmission subject cut data with the algorithm to render it as the encrypted data and decrypting the encrypted cut data with the algorithm used when encrypting the encrypted cut data to render it as the transmission subject cut data; connecting means for connecting the decrypted transmission subject cut data to render it as the transmission subject data; and transmitting and receiving means for transmitting and receiving the encrypted data.

The algorithm generating means of the communication system generates the algorithm each time the transmission subject data is encrypted or the encrypted data is decrypted, and uses a predetermined solution obtained by assigning at least one of the past solutions to a solution generating algorithm in the case of generating the algorithm and also erases the past solutions when it is no longer necessary to assign them anew.

The communication system successively generates the algorithms used for encryption and decryption by the algorithm generating means. The algorithm generating means uses the "solutions" in the case of generating the algorithms. As described above, the solutions are generated by using the past solutions. Furthermore, these solutions are erased once they become unnecessary to generate new solutions.

The past solutions are erased one after another in the communication system. For this reason, even if a third party can know the solutions at this point in time, they cannot know the route which the solution has traced to the generation thereof.

For the above reason, there is only a little possibility that encrypted communication by this communication system may be broken by the third party.

The solutions may be pseudo-random numbers as a result.

The communication system updates the algorithm in such timing as to perform the encryption and decryption by using the same algorithm for the first communication apparatus and the second communication apparatus. The algorithm generating means may generate the algorithm each time the transmission subject data is encrypted or the encrypted data is decrypted. Furthermore, it may generate the algorithm each time the transmission subject cut data is encrypted or the encrypted cut data is decrypted.

In the latter case, the encryption is performed with a different algorithm for each piece of the transmission subject cut data and so there is a less possibility that the encryption may be decrypted.

The algorithm generating means generates the new solutions from the past solutions. However, it may also obtain the solutions by assigning multiple past solutions to the solution generating algorithm. To be more specific, either one or multiple past solutions may be assigned to the solution generating algorithm to generate the new solutions.

The first invention may also be implemented by the following method.

This method is implemented in the communication system including the first communication apparatus and the second communication apparatus as two communication apparatuses capable of encrypting the transmission subject data in plain text to render it as the encrypted data and then transmitting it to the communication apparatus at the other end and also decrypting the received encrypted data and rendering it as the transmission subject data.

This method includes: the steps for one of the first communication apparatus and the second communication apparatus of: cutting the transmission subject data by a predetermined number of bits into multiple pieces of transmission subject cut data; generating algorithms sequentially; encrypting the transmission subject cut data with the algorithm to render it as the encrypted data; and transmitting the encrypted data to the other one of the first communication apparatus and the second communication apparatus, and the steps for the other one of the first communication apparatus and the second communication apparatus of: cutting the received encrypted data into multiple pieces of encrypted cut data by the same number of bits by which the encrypted data is cut when encrypted; sequentially generating the same algorithms as those generated by the one of the first communication apparatus and the second communication apparatus; decrypting the encrypted cut data with the algorithm used when encrypting the encrypted cut data to render it as the transmission subject cut data; and connecting the decrypted transmission subject cut data to render it as the transmission subject data.

According to this method, the one and the other of the first communication apparatus and the second communication apparatus generate the algorithm each time the transmission subject data is encrypted or the encrypted data is decrypted, and use a predetermined solution obtained by assigning at least one of past solutions to a solution generating algorithm in the case of generating the algorithm and also erase the past solutions when it is no longer necessary to assign them anew.

The second invention according to this application is as follows.

The second invention is a communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data, wherein: both the first communication apparatus and the second communication apparatus comprise: cutting means for cutting the transmission subject data by a predetermined number of bits into multiple pieces of transmission subject cut data, and also cutting the encrypted data by the same number of bits by which the encrypted data is cut when encrypted into multiple pieces of encrypted cut data; key generating means for sequentially generating keys rendered common between the first communication apparatus and the second communication apparatus; encrypting and decrypting means for encrypting the transmission subject cut data with the key and a predetermined algorithm to render it as the encrypted data and decrypting the encrypted cut data with the key used when encrypting the encrypted cut data and the same algorithm as the algorithm to render it as the transmission subject cut data; connecting means for connecting the decrypted transmission subject cut data to render it as the transmission subject data; and transmitting and receiving means for transmitting and receiving the encrypted data.

The key generating means of this communication system generates the key each time the transmission subject data is encrypted or the encrypted data is decrypted, and uses a predetermined solution obtained by assigning at least one of past solutions to a solution generating algorithm in the case of generating the key and also erases the past solutions when it is no longer necessary to assign them anew.

The communication system according to the second invention has a common leitmotif with the first invention. Instead of successively generating the algorithms as in the first invention, the communication system according to the second invention successively generates the keys. The keys of the second invention are generated by the key generating means. In the case of generating the keys, the past solutions are used as in the case of generating the algorithms in the first invention, and the past solutions are erased when they are no longer used. Therefore, there is only a little possibility that the communication may be broken by the third party as to the communication system according to the second invention.

The solutions in this case may also be pseudo-random numbers as a result.

The key generating means of the second invention may generate the key in any timing. For instance, the key generating means may generate the key each time the transmission subject cut data is encrypted or the encrypted cut data is decrypted.

The key generating means obtains the solution by assigning the past solutions to the solution generating algorithm. The number of the solutions assigned to the solution generating algorithm may be either one or multiple.

The second invention may also be implemented by the following method.

The second invention is a method implemented in a communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data.

The second invention includes: the steps for one of the first communication apparatus and the second communication apparatus of, cutting the transmission subject data by a predetermined number of bits into multiple pieces of transmission subject cut data; generating keys sequentially; encrypting the transmission subject cut data with the key and a predetermined algorithm to render it as the encrypted data; and transmitting the encrypted data to the other one of the first communication apparatus and the second communication apparatus, and the steps for the other one of the first communication apparatus and the second communication apparatus of: cutting the received encrypted data into multiple pieces of encrypted cut data by the same number of bits by which the encrypted data is cut when encrypted; sequentially generating the same keys as those generated by one of the first communication apparatus and the second communication apparatus;

decrypting the encrypted cut data with the key used when encrypting the encrypted cut data and the same algorithm as the algorithm to render it as the transmission subject cut data; and connecting the decrypted transmission subject cut data to render it as the transmission subject data. The one and the other of the first communication apparatus and the second communication apparatus generate the key each time the transmission subject data is encrypted or the encrypted data is decrypted, and use a predetermined solution obtained by assigning at least one of past solutions to a solution generating algorithm in the case of generating the key and also erase the past solutions when it is no longer necessary to assign them anew.

DETAILED DESCRIPTION OF THE PREFERRED EMBODIMENTS

Figure 1:
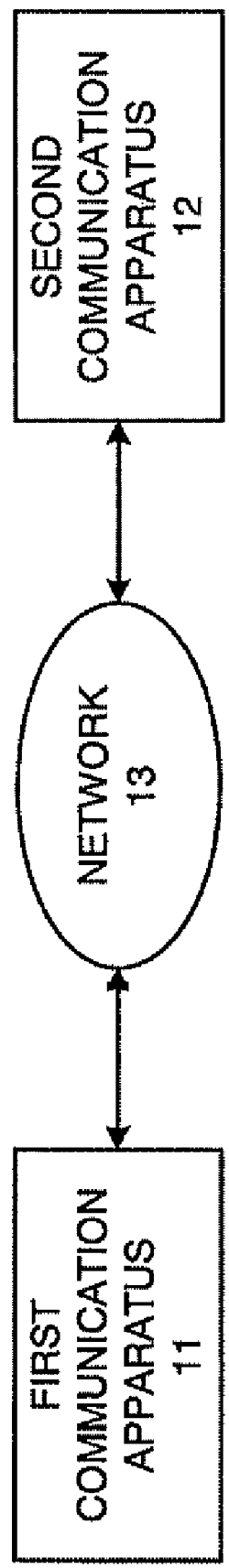
FIG. 1 is a diagram showing an overall configuration of a communication system according to an embodiment.

Hereunder, a preferred embodiment of the present invention will be described in detail by referring to the drawings.

A communication system according to this embodiment is roughly configured as shown in FIG. 1. The communication system includes a first communication apparatus 11 and a second communication apparatus 12 mutually connected via a network 13. The first communication apparatus 11 and the second communication apparatus 12 mutually perform encrypted communication.

The network 13 connecting the first communication apparatus 11 with the second communication apparatus 12 is the Internet for instance. Instead, it is also possible to configure the network 13 with another means, such as an intranet or a private line.

A description will be given as to configuration of the first communication apparatus 11 and the second communication apparatus 12. As the first communication apparatus 11 and the second communication apparatus 12 have the same configuration according to this embodiment, only the configuration of the first communication apparatus 11 will be described as a representative.

Figure 2:
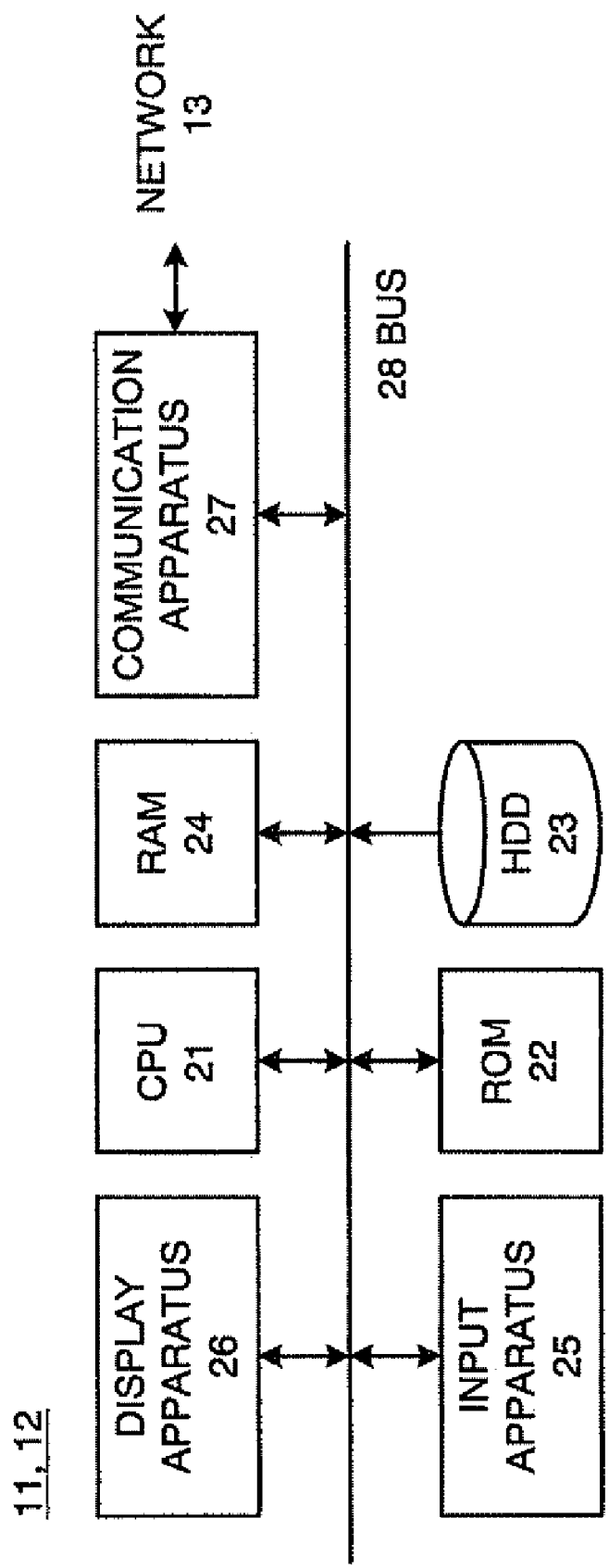
FIG. 2 is a diagram showing a hardware configuration of a first communication apparatus and a second communication apparatus included in the communication system shown in FIG. 1.

FIG. 2 shows hardware configuration of the first communication apparatus 11.

According to this embodiment, the first communication apparatus 11 comprises a CPU (central processing unit) 21, an ROM (read only memory) 22, an HDD (hard disk drive) 23, an RAM (random access memory) 24, an input apparatus 25, a display apparatus 26, a communication apparatus 27 and a bus 28. The CPU 21, ROM 22, HDD 23, RAM 24, input apparatus 25, display apparatus 26 and communication apparatus 27 can exchange data via the bus 28.

The ROM 22 or the HDD 23 has a predetermined program and predetermined data (this may include data to be transmission subject data as in this embodiment, and the predetermined data includes the data necessary to execute the program) recorded therein. The CPU 21 controls the entire first communication apparatus 11, and performs a process described later based on the program and data stored in the ROM 22 or the HDD 23. The RAM 24 is used as a work storage area on performing the process on the CPU 21.

The input apparatus 25 is configured by a keyboard, a mouse and so on, and is used to input commands and data. The display apparatus 26 may be configured by an LCD (liquid crystal display), CRT (cathode ray tube), and is used to display the commands, inputted data, a status of the process described later and so on.

The communication apparatus 27 performs communication with the second communication apparatus 12 via the network 13. The communication apparatus 27 of the second communication apparatus 12 performs communication with the first communication apparatus 11 via the network 13.

Figure 3:
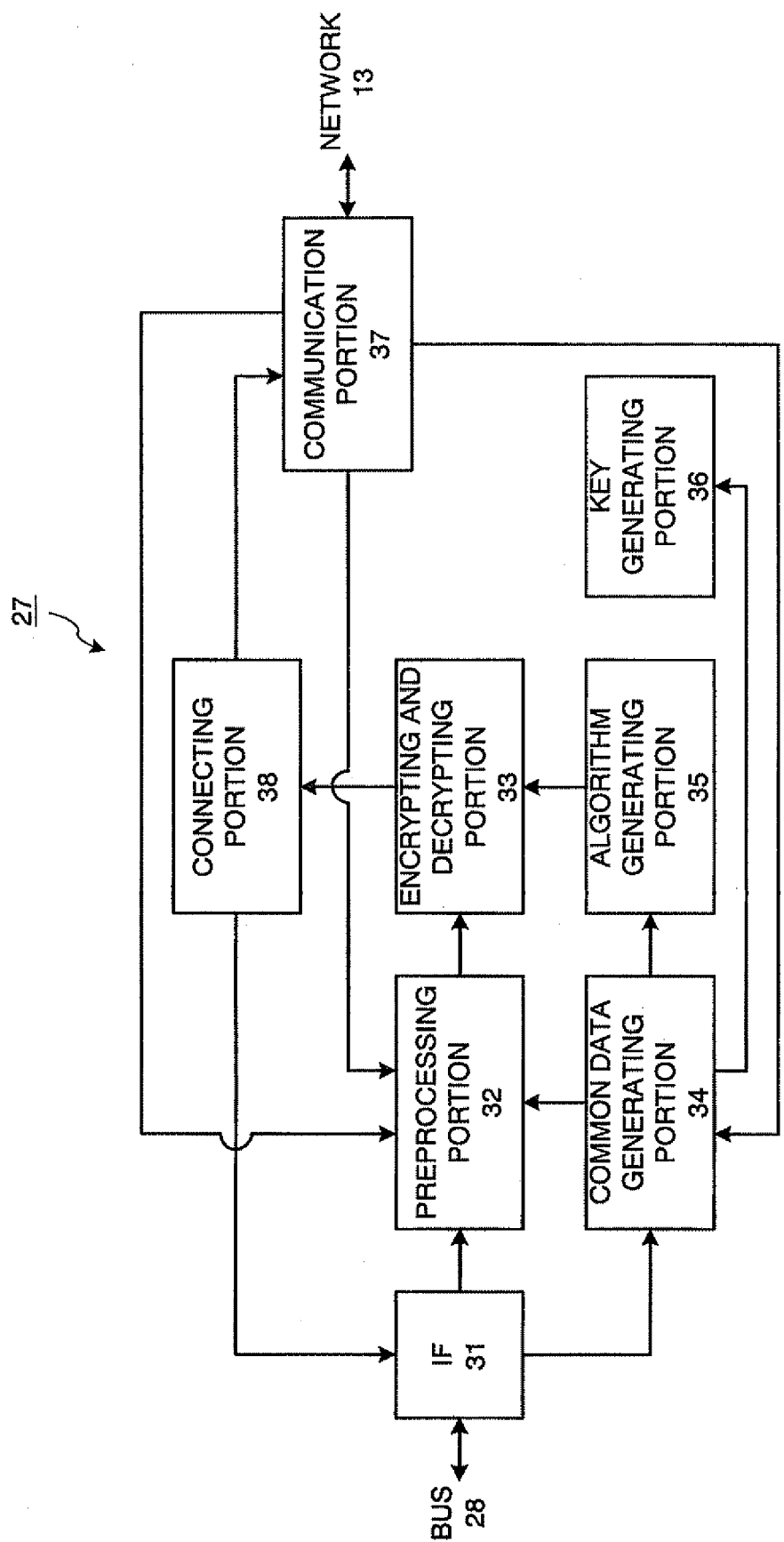
FIG. 3 is a block diagram showing a configuration of a communication apparatus of the first communication apparatus and second communication apparatus included in the communication system shown in FIG. 1.

Next, a description will be given as to the configuration of the communication apparatus 27. FIG. 3 shows a block diagram of the communication apparatus 27.

The communication apparatus 27 is configured by an interface portion 31, a preprocessing portion 32, an encrypting and decrypting portion 33, a common data generating portion 34, an algorithm generating portion 35, a key generating portion 36, a communication portion 37 and a connecting portion 38.

The interface portion 31 exchanges the data between the bus 28 and the encrypting and decrypting portion 33. The interface portion 31 also has a function of transmitting the data from the bus 28 to the common data generating portion 34 and the data from the connecting portion 38 to the bus 28.

The preprocessing portion 32 has a function of cutting the transmission subject data or the encrypted data received from the bus 28 via the interface portion 31 by a predetermined number of bits and generating transmission subject cut data or encrypted cut data to send it to the encrypting and decrypting portion 33. How to cut the transmission subject data and the encrypted data will be described later. According to this embodiment, the preprocessing portion 32 has a function of including dummy data having no relation with the transmission subject data in the transmission subject data by a method described later.

The encrypting and decrypting portion 33 has a function of receiving the transmission subject cut data or the encrypted cut data from the preprocessing portion 32, encrypting it in the case of receiving the transmission subject cut data or decrypting it in the case of receiving the encrypted cut data. The encrypting and decrypting portion 33 of this embodiment has a fixed reference number of bits as a processing unit in the case of performing the process of encryption and decryption. The reference number of bits in this embodiment is 8 bits although it is not limited thereto. Details of the encryption and decryption will be described later.

The common data generating portion 34 sequentially generates common data which is the data common between the first communication apparatus 11 and the second communication apparatus 12. The common data generating portion 34 of the first communication apparatus 11 and the second communication apparatus 12 of this embodiment sequentially generates the common data so that the common data in the same order becomes the same. The common data of this embodiment is the pseudo-random numbers though it does not always have to be the case. The generated common data is transmitted to the preprocessing portion 32, algorithm generating portion 35 and key generating portion 36.

The algorithm generating portion 35 generates the algorithms based on the common data received from the common data generating portion 34. The algorithms are used when the encrypting and decrypting portion 33 performs the encryption process and the decryption process.

The key generating portion 36 generates the keys based on the common data received from the common data generating portion 34. The keys are used when the encrypting and decrypting portion 33 performs the encryption process and decryption process.

The communication portion 37 exchanges the data with the network 13. The encrypted cut data generated by encrypting the transmission subject cut data in the encrypting and decrypting portion 33 is connected by the connecting portion 38, and is transmitted to the communication apparatus at the other end via the communication portion 37. The communication portion 37 receives the encrypted data from the communication apparatus at the other end. The encrypted data is transmitted from the communication portion 37 to the preprocessing portion 32.

The connecting portion 38 has a function of connecting the transmission subject cut data generated by decrypting the encrypted cut data in the encrypting and decrypting portion 33 in original order to render it as a set of the transmission subject data. The transmission subject data is transmitted to the interface portion 31, and is transmitted as necessary to the HDD 23 or the CPU 21 via the bus 28. The connecting portion 38 also has a function of connecting the encrypted cut data generated by encrypting the transmission subject cut data in the encrypting and decrypting portion 33 in original order to render it as a set of the encrypted data. The encrypted data is transmitted to the communication portion 37, and is transmitted from the communication portion 37 to the communication apparatus at the other end. The connecting portion 38 does not need to have a function of connecting the encrypted cut data generated by encrypting the transmission subject cut data in the encrypting and decrypting portion 33. In this case, the encrypted cut data is sequentially transmitted to the communication apparatus at the other end in order in which it is encrypted. In the case where the connecting portion 38 is as described above, the encrypted cut data can be directly transmitted to the communication portion 37 without going through the connecting portion 38.

Next, a description will be given as to a flow of the processing performed in the communication system.

Figure 4:
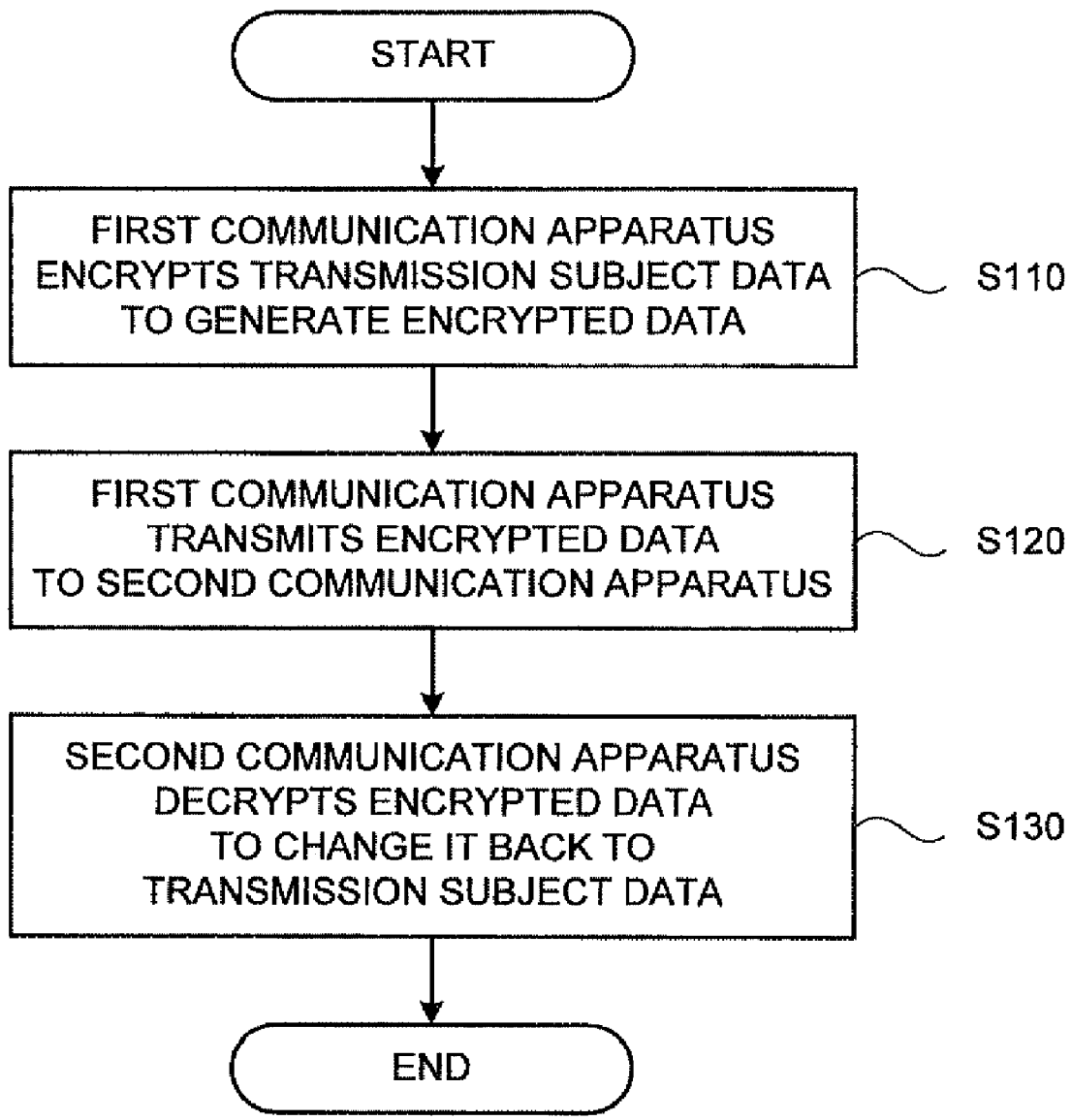
FIG. 4 is a flowchart showing a flow of a process executed in the communication system shown in FIG. 1.

To describe an outline by using FIG. 4, the flow of the processing performed in the communication system is as follows.

First, the first communication apparatus 11 encrypts the transmission subject data to generate the encrypted data (S110). Next, the first communication apparatus 11 transmits the encrypted data to the second communication apparatus 12 (S120). Next, the second communication apparatus 12 having received the encrypted data decrypts the encrypted data to change it back to the transmission subject data (S130).

Thus, the encrypted data is transmitted from the first communication apparatus 11 to the second communication apparatus 12 in the following description. As is obvious, there is no difference in the contents of the processing even if it is reverse to the above-mentioned case where the encrypted data is transmitted from the second communication apparatus 12 to the first communication apparatus 11.

Figure 5:
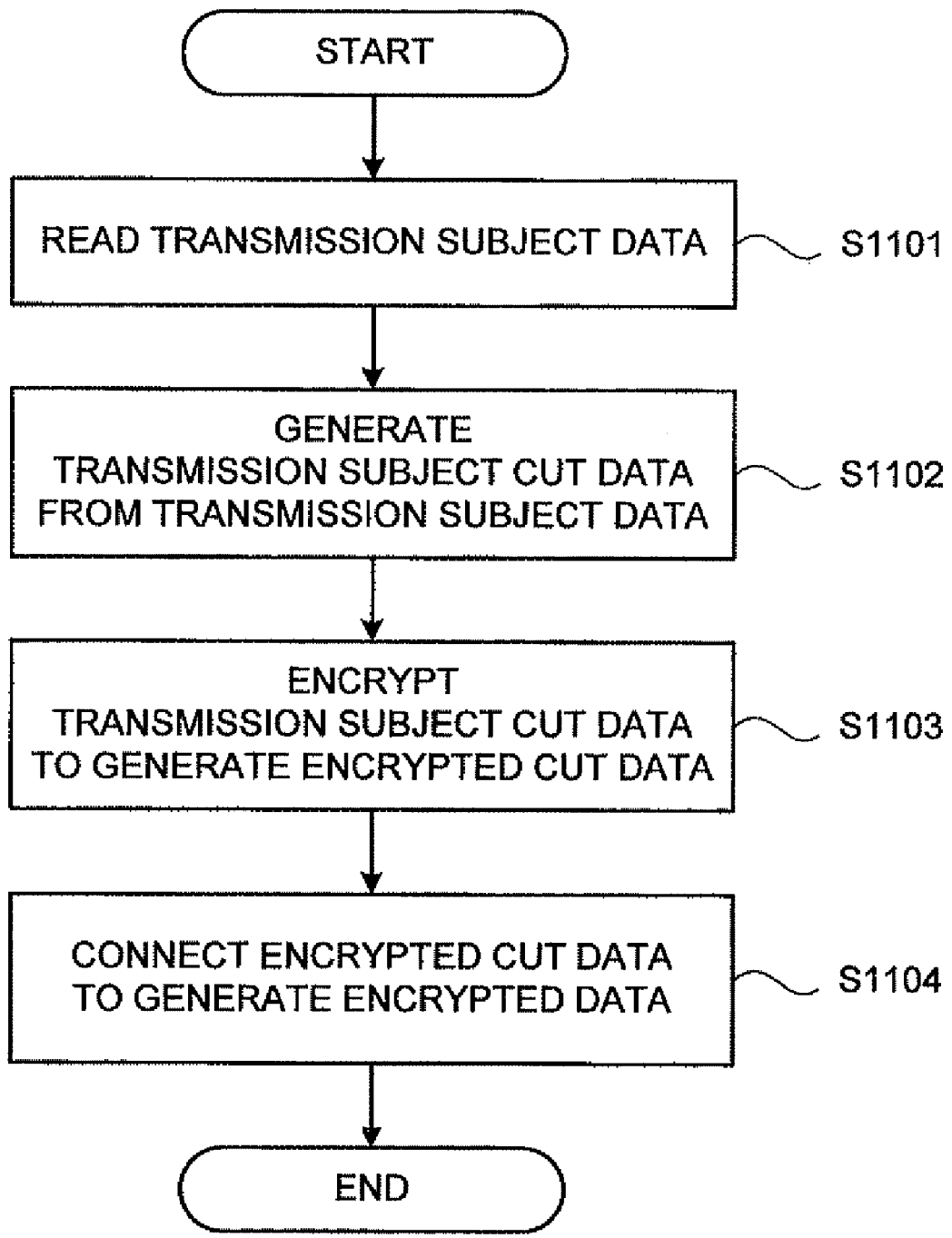
FIG. 5 is a flowchart showing a flow of a process of encryption executed in the first communication apparatus of the communication system shown in FIG. 1.
Figure 6:
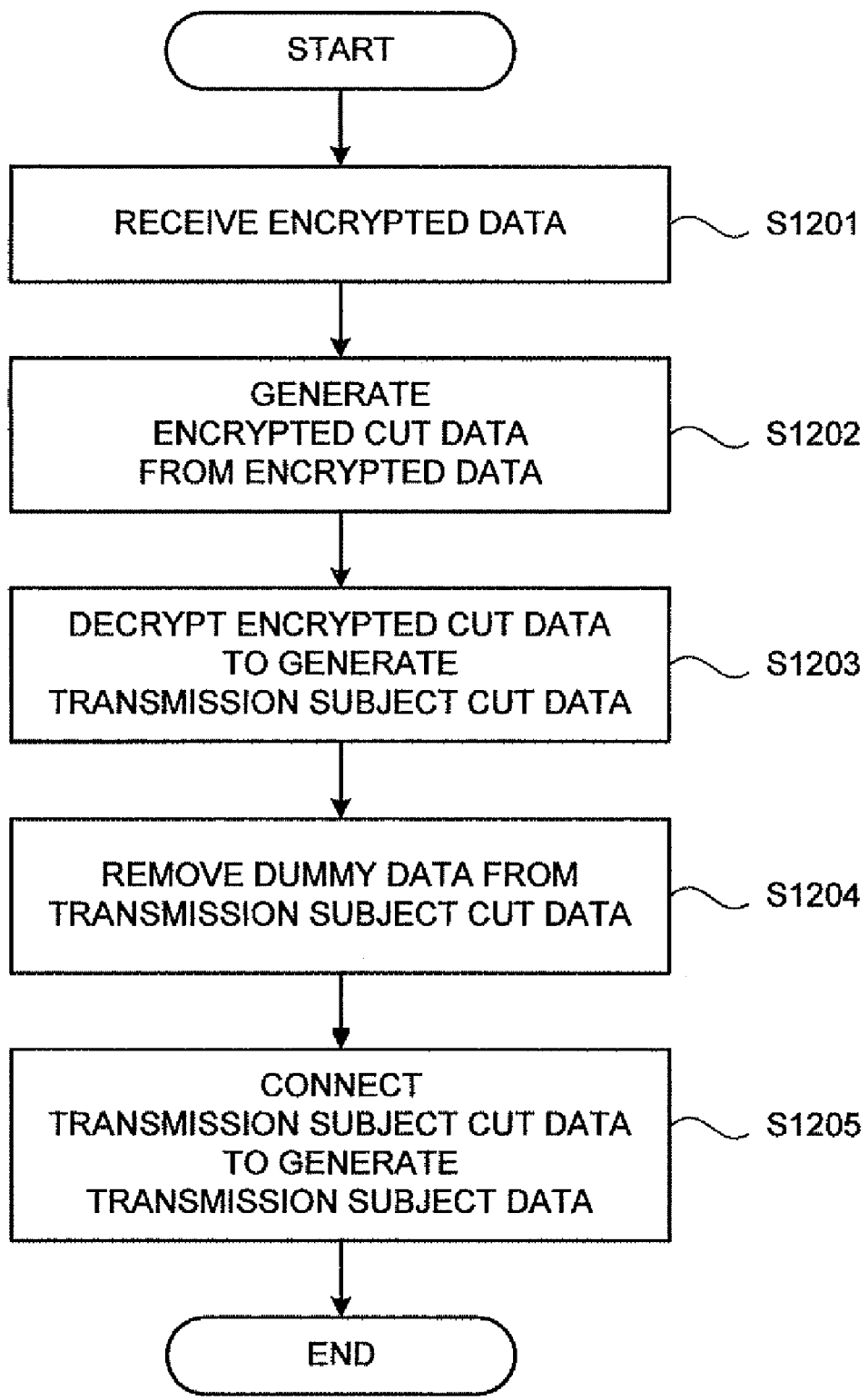
FIG. 6 is a flowchart showing a process of decryption executed in the second communication apparatus of the communication system shown in FIG. 1.

First, a detailed description will be given by referring to FIG. 5 as to the above-mentioned step S110 in which the first communication apparatus 11 encrypts the transmission subject data to generate the encrypted data.

First, the transmission subject data is read. The transmission subject data may be any data required to be transmitted from the first communication apparatus 11 to the second communication apparatus 12. According to this embodiment, the transmission subject data is recorded on the HDD 23. In the case where a command for transmitting the transmission subject data to the second communication apparatus 12 is inputted from the input apparatus 25 for instance, the CPU 21 reads out the transmission subject data from the HDD 23 and has it recorded temporarily in the RAM 24. The transmission subject data is transmitted from the RAM 24 to the preprocessing portion 32 via the bus 28 and the interface portion 31 in the communication apparatus 27 (S1101).

In the preprocessing portion 32, the transmission subject data is cut by a predetermined number of bits to be rendered as the transmission subject cut data (S1102). The preprocessing portion 32 includes the dummy data in the transmission subject cut data as necessary.

There may be just one method of generating the transmission subject cut data from the transmission subject data. According to this embodiment, however, the transmission subject cut data is generated from the transmission subject data by one of the following three methods.

A) The case of cutting the transmission subject data into the transmission subject cut data by a predetermined number of bits shorter than the reference number of bits, and including the dummy data at respective fixed positions of pieces of the transmission subject cut data all of which have the number of bits shorter than the reference number of bits B) The case of cutting the transmission subject data into the transmission subject cut data by a predetermined number of bits shorter than the reference number of bits, and including the dummy data at different positions of pieces of the transmission subject cut data all of which have the number of bits shorter than the reference number of bits C) The case of cutting the transmission subject data into the transmission subject cut data by the number of bits the same as or shorter than the reference number of bits, and including the dummy data in respective pieces of the transmission subject cut data having the number of bits shorter than the reference number of bits It is decided by the common data generated by the common data generating portion 34 as to which of the above-mentioned three methods should be used to generate the transmission subject cut data from the transmission subject data.

A description will be given first as to how the common data generating portion 34 generates the common data.

In the case where the interface portion 31 receives the transmission subject data from the bus 28, the common data generating portion 34 receives that information from the interface portion 31.

The common data generating portion 34 takes this opportunity to start generating the common data. According to this embodiment, the common data generating portion 34 generates the common data each time the transmission subject data is received by the interface portion 31. The common data of this embodiment is a matrix (X) with 8 rows and 8 columns although it is not limited thereto.

According to this embodiment, the common data generating portion 34 generates the common data successively as if in nonlinear transition though it does not always have to be the case.

To generate the common data successively as if in nonlinear transition, there are thinkable techniques, such as (1) including exponential calculation of past common data in the process of generating the common data, (2) including multiplication of two or more pieces of the past common data in the process of generating the common data, or a combination of (1) and (2).

According to this embodiment, the common data generating portion 34 has a 01st solution ($X_{01}$) and a 02nd solution ($X_{02}$) predetermined as initial matrixes (for instance, the 01st solution and a 02nd solution are recorded in a predetermined memory).

The common data generating portion 34 assigns the initial matrixes to the solution generating algorithm and generates a 1st solution ($X_1$) as follows.

1st solution $(X_1) = X_{02} X_{01} + \alpha$ ($\alpha$=matrix with 8 rows and 8 columns)

This is the common data generated first.

Next, in the case where the interface portion 31 receives the transmission subject data from the bus 28, the common data generating portion 34 generates a 2nd solution ($X_2$) as follows.

2nd solution $(X_2) = X_1 X_{02} + \alpha$

Similarly, each time the interface portion 31 receives the transmission subject data from the bus 28, the common data generating portion 34 generates 3rd, 4th, .... Nth solutions as follows.

3rd solution $(X_3) = X_2 X_1 + \alpha$

4th solution $(X_4) = X_3 X_2 + \alpha$

Nth solution $(X_N) = X_{N-1} X_{N-2} + \alpha$

The common data thus generated (that is, the solutions) are transmitted to the preprocessing portion 32 and the algorithm generating portion 35, and are also held in the common data generating portion 34. To generate the Nth solution ($X_N$), this embodiment uses an N−1st solution ($X_{N-1}$) and an N−2nd solution ($X_{N-2}$), that is, the two solutions generated immediately before then. Therefore, to generate the new solution, the common data generating portion 34 must hold the nearest preceding two solutions generated in the past (or else, the two solutions must be held by something else). Inversely, the solutions older than the nearest preceding two solutions generated in the past are not to be used to generate the new solution from now on. Thus, this embodiment always holds the two past solutions in the common data generating portion 34. However, this embodiment erases the solution which is now the third nearest preceding solution due to the generation of the new solution but was the second nearest preceding solution till then from the predetermined memory or the like in which it was recorded.

The solutions thus generated are chaotic in nonlinear transition, and are also the pseudo-random numbers.

To cause the nonlinear transition, it is thinkable to use the following formulas other than the above-mentioned formula: Nth solution $(X_N) = X_{N-1} X_{N-2} + \alpha$.

For instance:
(a) Nth solution $(X_N) = (X_{N-1})^P$
(b) Nth solution $(X_N) = (X_{N-1})^P (X_{N-2})^Q (X_{N-3})^R (X_{N-4})^S$
(c) Nth solution $(X_N) = (X_{N-1})^P + (X_{N-2})^Q$ P, Q, R and S are predetermined constants respectively. The common data generating portion 34 has two initial matrixes in the case of using the formula (a) or (c), and has four initial matrixes in the case of using the formula (b).

The above-mentioned $\alpha$ is a constant. However, it may also be specific changing environmental information. The environmental information is the information naturally generated in sequence as time elapses and commonly obtainable at distant places, such as the information determined based on weather of a specific region, information determined based on the contents of a TV broadcast of a TV station broadcasted at a specific time and information determined based on a result of a specific sport.

It is possible to further improve confidentiality of the communication by creating the above-mentioned $\alpha$ in series and generating the common data.

It is also possible, as a matter of course, to add a, (may be generated from the environmental information) to right sides of the formulas (a) to (c).

As described above, the preprocessing portion 32 having received the common data (that is, the above-mentioned solutions) decides which of the above-mentioned methods of A), B) and C) should be used to generate the transmission subject cut data. According to this embodiment, the transmission subject cut data is generated by the method A) in the case where, in dividing the sum of adding up the numbers configuring the matrix with 8 rows and 8 columns by 3, a remainder thereof is 0, by the method B) in the case where the remainder is 1, and by the method C) in the case where the remainder is 2, though it does not always have to be the case.

In the case of generating the transmission subject cut data by the method A), the preprocessing portion 32 cuts the transmission subject data received from the interface portion 31 by the predetermined number (7 bits in this embodiment) of bits shorter than the reference number of bits in order from the head to generate the transmission subject cut data. The preprocessing portion 32 embeds the dummy data at a fixed position of the transmission subject cut data. The positions of the transmission subject cut data for embedding the dummy data may be either variable or fixed. In the latter case, the positions at which the dummy data is embedded may be the head or the end of the transmission subject cut data or a predetermined intermediate position such as a second bit or a third bit. The dummy data may be any data as long as it is irrelevant data to the transmission subject data. For instance, there are thinkable processes, such as constantly embedding the data of 0 or the data of 1, or embedding the data of 1, or alternately embedding the data of 1 and 0. As another example, it is possible to decide what dummy data is to be embedded based on the above-mentioned common data. For instance, if the sum of the numbers configuring the matrix with 8 rows and 8 columns as the common data added up is divided by 9 and the remainder thereof is 0, it is possible to continue 0, such as 0, 0, 0 . . . . If the remainder is 1, it is possible to put in 1 alternately, such as 0, 1, 0, 1 . . . . If the remainder is 2, it is possible to put in 1 at every third place, such as 0, 0, 1, 0, 0, 1 . . . . Likewise, it is possible to put in 1 at every fourth place if the remainder is 3, put in 1 at every fifth place if the remainder is 4, and put in 1 at every tenth place if the remainder is 9.

In the case of generating the transmission subject cut data by the method B), the preprocessing portion 32 cuts the transmission subject data by the predetermined number (7 bits for instance) of bits shorter than the reference number of bits to render it as the transmission subject cut data, and includes the dummy data at different positions of pieces of the transmission subject cut data all of which have the number of bits shorter than the reference number of bits. In this case, the positions at which the dummy data is embedded may be fixed or regularly changing, such as moving in order of the first bit, second bit, third bit . . . eighth bit, first bit, second bit, . . . eighth bit, or randomly changing as to each piece of the transmission subject cut data. In the case where the positions at which the dummy data is embedded randomly change, the positions may be decided based on the common data for instance.

As for the method of deciding the reference number of bits for embedding the dummy data by using the common data, it is possible to perform the following processes for instance. If the sum of the numbers configuring the matrix with 8 rows and 8 columns as the common data added up is divided by 8 and the remainder thereof is 0, the dummy data is embedded alternately at the head and the end of the pieces of the transmission subject cut data. If the remainder is 1, the transmission subject cut data having the dummy data embedded at the head and the transmission subject cut data having the dummy data embedded at the end are arranged to be at every third place. If the remainder is 2, the transmission subject cut data having the dummy data embedded at the head and the transmission subject cut data having the dummy data embedded at the end are arranged to be at every fourth place. If the remainder is 7, the transmission subject cut data having the dummy data embedded at the head and the transmission subject cut data having the dummy data embedded at the end are arranged to be at every ninth place. It is also possible to further move the positions at which the dummy data is embedded such as the head and end rather than fixing the positions.

In the case of generating the transmission subject cut data by the method C), the transmission subject data is cut to be the reference number of bits or the number of bits shorter than the reference number of bits. This cutting can be performed by cutting the transmission subject data to a random length shorter than 8 bits. For instance, if the sum of the numbers configuring the matrix with 8 rows and 8 columns as the common data added up is divided by 8 and the remainder thereof is 0, the head of the transmission subject data at that point in time can be cut by 8 bits. If the remainder is 1, the head of the transmission subject data at that point in time can be cut by 1 bit. If the remainder is 2, the head of the transmission subject data at that point in time can be cut by 2 bits . . . . If the remainder is 7, the head of the transmission subject data at that point in time can be cut by 7 bits. Of the transmission subject cut data thus generated, the preprocessing portion 32 embeds the dummy data in each piece of the transmission subject cut data of which number of bits is shorter than the reference number of bits. In this case, an embedding position of the dummy data may be a specific position such as the head or the end or a predetermined changing position specified by the common data for instance.

In any case, the transmission subject cut data thus generated is transmitted to the encrypting and decrypting portion 33 as a stream in order of generation.

In parallel with the generation of the transmission subject cut data, the algorithm generating portion 35 generates an algorithm used on encrypting the transmission subject cut data.

The algorithm generating portion 35 generates the algorithm based on the common data.

According to this embodiment, the algorithm generating portion 35 generates the algorithm as follows.

The algorithm of this embodiment is defined as "in the case where the transmission subject cut data as 8-bit data is a matrix Y with 1 row and 8 columns, it is acquired by multiplying by Y the matrix X with 8 rows and 8 columns as the common data raised to the a-th power and turned clockwise by n×90°."

Here, there are the cases where a is a predetermined constant. According to this embodiment, however, it is a number changing based on the common data. To be more specific, the algorithm of this embodiment changes based on the common data. For instance, a can be defined as the remainder in the case of dividing by 5 the number acquired by adding up all the numbers as elements of the matrix included in the common data which is the matrix with 8 rows and 8 columns (provided that it is a=1 in the case where the remainder is 0).

The above-mentioned n is a predetermined number defined by the key. If the key is a constant number, n is fixed. As described below, however, the key changes based on the common data. To be more specific, this n also changes based on the common data according to this embodiment.

It is also possible to decide on another algorithm.

According to this embodiment, the algorithm generating portion 35 generates the algorithm each time it receives the common data from the common data generating portion 34, and transmits it to the encrypting and decrypting portion 33.

In parallel with the generation of the transmission subject cut data, the key generating portion 36 generates the key used on encrypting the transmission subject cut data.

The key generating portion 36 generates the key based on the common data.

According to this embodiment, the key generating portion 36 generates the key as the following.

The key of this embodiment is the number acquired by adding up all the numbers as elements of the matrix included in the common data which is the matrix with 8 rows and 8 columns. Therefore, the key changes based on the common data according to this embodiment.

It is also possible to decide on another key.

According to this embodiment, the key generating portion 36 generates the key each time it receives the common data from the common data generating portion 34, and transmits it to the encrypting and decrypting portion 33.

The encrypting and decrypting portion 33 encrypts the transmission subject cut data received from the preprocessing portion 32 based on the algorithm received from the algorithm generating portion 35 and the key received from the key generating portion 36 (S1103).

As described above, the algorithm is defined as "in the case where the transmission subject cut data as 8-bit data is a matrix Y with 1 row and 8 columns, it is acquired by multiplying by Y the matrix X with 8 rows and 8 columns as the common data raised to the a-th power and turned clockwise by n×90°," and n as the key is the above-mentioned number.

In the case where a is 3 and n is 6, the encryption is performed by multiplying by the transmission subject cut data the matrix with 8 rows and 8 columns acquired by turning the matrix with 8 rows and 8 columns acquired by cubing X clockwise by 6×90°=540°.

The data thus generated is the encrypted cut data.

The encrypted cut data is transmitted to the connecting portion 38. The connecting portion 38 connects the encrypted cut data as one, and generates the encrypted data (S1104). Sorting order of the encrypted cut data in this case is corresponding to the original sorting order of the encrypted cut data.

Thus, the step of S110 in which the first communication apparatus 11 encrypts the transmission subject data to generate the encrypted data is finished.

The encrypted data is transmitted to the communication portion 37 and then transmitted to the second communication apparatus 12 via the network 13.

The second communication apparatus 12 having received the encrypted data performs the step S130 of decrypting the encrypted data and changing it back to the transmission subject data.

Hereunder, this step of decryption will be described in detail.

The encrypted data transmitted to the second communication apparatus 12 is received by the communication portion 37 of the second communication apparatus 12 (S1201).

The communication portion 37 transmits the encrypted data to the preprocessing portion 32.

The preprocessing portion 32 cuts the received encrypted data by a predetermined number of bits, and generates the encrypted cut data (S1202).

In the case of cutting the encrypted data and generating the encrypted cut data, the preprocessing portion 32 performs a process reverse to the process performed by the connecting portion 38 of the first communication apparatus 11. To be more specific, the encrypted data is cut by 8 bits from the head to be divided into multiple pieces of the encrypted cut data.

Next, the encrypted cut data is transmitted to the encrypting and decrypting portion 33, where it is decrypted and rendered as the transmission subject cut data (S1203).

The decryption is performed as a process reverse to the process performed by the encrypting and decrypting portion 33 of the first communication apparatus 11. For that reason, the second communication apparatus 12 requires the algorithm and key required on performing the encryption on the first communication apparatus 11.

The algorithm and key used for the decryption are generated inside the second communication apparatus 12. Working thereof will be described.

The information that the communication portion 37 of the second communication apparatus 12 received the encrypted data is transmitted from the communication portion 37 to the common data generating portion 34. The common data generating portion 34 having received this information takes this opportunity to generate the common data each time it receives this information.

The generation of the common data by the common data generating portion 34 of the second communication apparatus 12 is performed through the same step as the step performed by the common data generating portion 34 of the first communication apparatus 11. The common data generating portion 34 of the second communication apparatus 12 has the same initial matrix and solution generating algorithm as the common data generating portion 34 of the first communication apparatus 11. Therefore, the common data generated by the second communication apparatus 12 is the same as the common data generated by the first communication apparatus 11 if the data in the same order of generation is compared.

The generated common data is transmitted from the common data generating portion 34 to the preprocessing portion 32, algorithm generating portion 35 and key generating portion 36.

The algorithm generating portion 35 generates the algorithm based on the received common data each time it receives the common data. The step in which the algorithm generating portion 35 of the second communication apparatus 12 generates the algorithm is the same as the step in which the algorithm generating portion 35 of the first communication apparatus 11 generates the algorithm. The generated algorithm is transmitted from the algorithm generating portion 35 to the encrypting and decrypting portion 33.

The key generating portion 36 generates the key based on the received common data each time it receives the common data. The step in which the key generating portion 36 of the second communication apparatus 12 generates the key is the same as the step in which the key generating portion 36 of the first communication apparatus 11 generates the key. The generated key is transmitted from the key generating portion 36 to the encrypting and decrypting portion 33.

As for this communication system, new common data is generated on the first communication apparatus 11 each time the encryption is performed on the first communication apparatus 11, and new common data is also generated on the second communication apparatus 12 each time the decryption is performed on the second communication apparatus 12. As described above, the common data generated by the second communication apparatus 12 is the same as the common data generated by the first communication apparatus 11 if the data in the same order of generation is compared. Therefore, all the common data generated when encrypting certain transmission subject data on the first communication apparatus 11 and the algorithms and keys generated based on that common data constantly match with the common data generated on the second communication apparatus 12 and the algorithms and keys generated based on that common data when decrypting the encrypted data generated by using that common data and the algorithms and keys generated based on the common data. These circumstances are the same even when the encryption is performed on the second communication apparatus 12 and the decryption is performed on the first communication apparatus 11.

As described above, the encrypting and decrypting portion 33 performs the decryption process by using the algorithm received from the algorithm generating portion 35. To put it in more detail, the encrypting and decrypting portion 33 performs the decryption process by generating the algorithm for performing the decryption process (defined as "in the case where the encrypted cut data is a matrix Z with 1 row and 8 columns, the transmission subject cut data is acquired by multiplying by Y an inverse matrix of the matrix X with 8 rows and 8 columns as the common data raised to the a-th power and turned clockwise by n×90°"') based on the algorithm received from the algorithm generating portion 35 (defined as "in the case where the transmission subject cut data as 8-bit data is a matrix Y with 1 row and 8 columns, the encrypted cut data is acquired by multiplying by Y the matrix X with 8 rows and 8 columns as the common data raised to the a-th power and turned clockwise by n×90°"') and performing calculation according to the above-mentioned definition by using the key. Thus, the encrypting and decrypting portion 33 decrypts the encrypted cut data provided as a stream from the preprocessing portion 32 one after another so as to generate the transmission subject cut data.

Next, the encrypting and decrypting portion 33 removes the dummy data from the transmission subject cut data as required (S1204). As described above, the common data generated by the common data generating portion 34 is transmitted to the preprocessing portion 32. This common data was used when determining how the dummy data was embedded in the transmission subject cut data in the preprocessing portion 32 of the first communication apparatus 11. To be more specific, the common data held by the preprocessing portion 32 of the second communication apparatus 12 at that point in time indicates how the dummy data was embedded in the encrypted cut data (to be more precise, the transmission subject cut data before having the encrypted cut data encrypted) completely decrypted (or being decrypted or just to be decrypted) by the encrypting and decrypting portion 33 of the second communication apparatus 12.

The preprocessing portion 32 transmits to the encrypting and decrypting portion 33 the information on where in the transmission subject cut data decrypted by the encrypting and decrypting portion 33 the dummy data is embedded.

The encrypting and decrypting portion 33 removes the dummy data from the transmission subject cut data by using the information.

The transmission subject cut data thus generated is transmitted to the connecting portion 38. The connecting portion 38 connects the received transmission subject cut data as one and changes it back to the transmission subject data in the original state before being encrypted on the first communication apparatus 11 (S1205).

Thus, the step 130 in which the second communication apparatus 12 decrypts the encrypted data and changes it back to the transmission subject data is finished.

The generated transmission subject data is transmitted from the connecting portion 38 to the interface portion 31, and is then transmitted to the HDD 23 for instance via the bus 28 to be stored therein.

<<Deformed Example>>

In the communication system described above, the common data generating portion 34 generates the common data each time the transmission subject data is received by the interface portion 31 or each time the encrypted data is received by the communication portion 37. In this case, all the pieces of the transmission subject cut data generated from one piece of the transmission subject data are encrypted by the same algorithm.

Instead of this, the common data generating portion 34 may generate the common data each time the transmission subject cut data is received by the encrypting and decrypting portion 33 or each time the encrypted cut data is received by the encrypting and decrypting portion 33. In this case, the encryption is performed by different algorithm and key for each piece of the transmission subject cut data generated from one piece of the transmission subject data.

In such a deformed example, the common data, algorithm and key are generated as follows in the case of performing the encryption.

First, the case of performing the encryption will be described.

If the interface portion 31 receives the transmission subject data, the information to that effect is transmitted from the interface portion 31 to the common data generating portion 34. On receiving it, the common data generating portion 34 generates the common data as in the case of the above-mentioned embodiment. The common data is transmitted to the preprocessing portion 32, algorithm generating portion 35 and key generating portion 36. On receiving the common data, the preprocessing portion 32 starts generating the transmission subject cut data by cutting the transmission subject data as in the case of the above-mentioned embodiment. The algorithm generating portion 35 generates the algorithm based on the received common data, and transmits the generated algorithm to the encrypting and decrypting portion 33. The key generating portion 36 generates the key based on the received common data, and transmits the generated key to the encrypting and decrypting portion 33.

The encrypting and decrypting portion 33 encrypts the received transmission subject cut data with the received algorithm and key to generate a first piece of the encrypted cut data.

Next, the common data generating portion 34 generates the common data before a second piece of the transmission subject cut data is transmitted from the preprocessing portion 32 to the encrypting and decrypting portion 33 so as to transmit it to the algorithm generating portion 35 and key generating portion 36. On receiving it, the algorithm generating portion 35 generates an algorithm different from the one used to generate the first piece of the encrypted cut data, and transmits it to the encrypting and decrypting portion 33. The key generating portion 36 similarly generates a key different from the first one, and transmits it to the encrypting and decrypting portion 33. The encrypting and decrypting portion 33 uses the algorithm and key to generate the second piece of the encrypted cut data by using the second piece of the transmission subject cut data.

This is repeated to perform different encryption to each piece of the encrypted cut data.

In this deformed example, the second piece onward of the common data are only transmitted to the algorithm generating portion 35 and key generating portion 36. However, the second piece onward of the common data may also be transmitted to the preprocessing portion 32. In this case, it is possible to change the method of generating the transmission subject cut data as to each piece of the transmission subject cut data.

Next, the cases where the decryption is performed will be described.

If the communication portion 37 receives the encrypted data, the information to that effect is transmitted from the communication portion 37 to the common data generating portion 34. On receiving it, the common data generating portion 34 generates the common data as in the case of the above-mentioned embodiment. The common data is transmitted to the preprocessing portion 32, algorithm generating portion 35 and key generating portion 36. On receiving the common data, the preprocessing portion 32 generates the information on how the transmission subject cut data was generated as in the case of the above-mentioned embodiment and transmits it to the encrypting and decrypting portion 33. The algorithm generating portion 35 generates the algorithm based on the received common data, and transmits the generated algorithm to the encrypting and decrypting portion 33. The key generating portion 36 generates the key based on the received common data, and transmits the generated key to the encrypting and decrypting portion 33. The algorithm and key are equal to the algorithm and key used when encrypting that transmission subject cut data respectively. The preprocessing portion 32 transmits the encrypted cut data generated by cutting the encrypted data to the encrypting and decrypting portion 33 as in the case of the above-mentioned embodiment.

The encrypting and decrypting portion 33 decrypts the received encrypted cut data with the algorithm for decryption generated by using the received algorithm so as to generate the first piece of the transmission subject cut data. The encrypting and decrypting portion 33 removes the dummy data from the generated transmission subject cut data according to the received above-mentioned information on how the transmission subject cut data was generated.

Next, the common data generating portion 34 generates a next piece of the common data before the second piece of the transmission subject cut data is transmitted from the preprocessing portion 32 to the encrypting and decrypting portion 33 so as to transmit it to the algorithm generating portion 35. On receiving it, the algorithm generating portion 35 generates an algorithm different from the one used to generate the first piece of the transmission subject cut data, and transmits it to the encrypting and decrypting portion 33. This algorithm is the same as the algorithm used to encrypt that transmission subject cut data. On receiving the common data, the key generating portion 36 generates a key different from the key used to generate the first piece of the transmission subject cut data, and transmits it to the encrypting and decrypting portion 33. This key is the same as the key used to encrypt that transmission subject cut data.

The encrypting and decrypting portion 33 decrypts the second piece of the encrypted cut data by using these algorithm and key to generate the second piece of transmission subject cut data. It also removes the dummy data as in the case of the above-mentioned embodiment.

This is repeated to decrypt each piece of the encrypted cut data with the different algorithm and key so as to generate the transmission subject cut data one after another.

In the case where, in performing the encryption, the method of generating the transmission subject cut data is changed as to each piece of the transmission subject cut data by also transmitting the second piece onward of the common data to the preprocessing portion 32, the second piece onward of the common data are also transmitted to the preprocessing portion 32 when performing the decryption. Thus, the preprocessing portion 32 generates the information on how the transmission subject cut data was generated as to each piece of the encrypted cut data. The thus generated above-mentioned information on how the transmission subject cut data was generated is transmitted to the encrypting and decrypting portion 33 each time the encrypted cut data is decrypted by the encrypting and decrypting portion 33. The encrypting and decrypting portion 33 uses this information to securely remove the dummy data embedded in each piece of the transmission subject cut data by a different method.

The invention claimed is:

1. A communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data, wherein:
   both the first communication apparatus and the second communication apparatus comprise:
   cutting means for cutting the transmission subject data by a predetermined number of bits into multiple pieces of transmission subject cut data, and also cutting the encrypted data by the same number of bits by which the encrypted data is cut when encrypted into multiple pieces of encrypted cut data;
   algorithm generating means for sequentially generating algorithms rendered common between the first communication apparatus and the second communication apparatus;
   encrypting and decrypting means for encrypting the transmission subject cut data with the algorithm and a predetermined key to render it as the encrypted data and decrypting the encrypted cut data with the algorithm used when encrypting the encrypted cut data and the same key as the key to render it as the transmission subject cut data;
   connecting means for connecting the decrypted transmission subject cut data to render it as the transmission subject data; and
   transmitting and receiving means for transmitting and receiving the encrypted data, and
   the algorithm generating means generates the algorithm each time the transmission subject data is encrypted or the encrypted data is decrypted, and uses a predetermined solution obtained by assigning at least one of past solutions to a solution generating algorithm in the case of generating the algorithm and also erases the past solutions when it is no longer necessary to assign them anew.

2. The communication system according to claim 1, wherein:
   the algorithm generating means generates the algorithm each time the transmission subject cut data is encrypted or the encrypted cut data is decrypted.

3. The communication system according to claim 1, wherein:
   the algorithm generating means obtains the solution by assigning multiple past solutions to the solution generating algorithm.

4. A communication apparatus included in the communication system according to claim 1.

5. A communication method implemented in a communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data, including:
   the steps for one of the first communication apparatus and the second communication apparatus of:
   cutting the transmission subject data by a predetermined number of bits into multiple pieces of transmission subject cut data;
   generating algorithms sequentially;
   encrypting the transmission subject cut data with the algorithm to render it as the encrypted data; and
   transmitting the encrypted data to the other one of the first communication apparatus and the second communication apparatus, and
   the steps for the other one of the first communication apparatus and the second communication apparatus of:
   cutting the received encrypted data into multiple pieces of encrypted cut data by the same number of bits by which the encrypted data is cut when encrypted;
   sequentially generating the same algorithms as those generated by the one of the first communication apparatus and the second communication apparatus;
   decrypting the encrypted cut data with the algorithm used when encrypting the encrypted cut data to render it as the transmission subject cut data; and
   connecting the decrypted transmission subject cut data to render it as the transmission subject data, and
   the one and the other of the first communication apparatus and the second communication apparatus generate the algorithm each time the transmission subject data is encrypted or the encrypted data is decrypted, and use a predetermined solution obtained by assigning at least one of past solutions to a solution generating algorithm in the case of generating the algorithm and also erase the past solutions when it is no longer necessary to assign them anew.

6. A communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data, wherein;
   both the first communication apparatus and the second communication apparatus comprise:
   cutting means for cutting the transmission subject data by a predetermined number of bits into multiple pieces of transmission subject cut data, and also cutting the encrypted data by the same number of bits by which the encrypted data is cut when encrypted into multiple pieces of encrypted cut data;

key generating means for sequentially generating keys rendered common between the first communication apparatus and the second communication apparatus;

encrypting and decrypting means for encrypting the transmission subject cut data with the key and a predetermined algorithm to render it as the encrypted data and decrypting the encrypted cut data with the key used when encrypting the encrypted cut data and the same algorithm as the algorithm to render it as the transmission subject cut data;

connecting means for connecting the decrypted transmission subject cut data to render it as the transmission subject data; and transmitting and receiving means for transmitting and receiving the encrypted data, and the key generating means generates the key each time the transmission subject data is encrypted or the encrypted data is decrypted, and uses a predetermined solution obtained by assigning at least one of past solutions to a solution generating algorithm in the case of generating the key and also erases the past solutions when it is no longer necessary to assign them anew.

7. The communication system according to claim 6, wherein:

the key generating means generates the key each time the transmission subject cut data is encrypted or the encrypted cut data is decrypted.

8. The communication system according to claim 6, wherein:

the key generating means obtains the solution by assigning multiple past solutions to the solution generating algorithm.

9. A communication method implemented in a communication system including a first communication apparatus and a second communication apparatus as two communication apparatuses capable of encrypting transmission subject data in plain text to render it as encrypted data and then transmitting it to the communication apparatus at the other end and also decrypting received encrypted data and rendering it as the transmission subject data, including:

the steps for one of the first communication apparatus and the second communication apparatus of:

cutting the transmission subject data by a predetermined number of bits into multiple pieces of transmission subject cut data;

generating keys sequentially;

encrypting the transmission subject cut data with the key and a predetermined algorithm to render it as the encrypted data; and transmitting the encrypted data to the other one of the first communication apparatus and the second communication apparatus, and the steps for the other one of the first communication apparatus and the second communication apparatus of:

cutting the received encrypted data into multiple pieces of encrypted cut data by the same number of bits by which the encrypted data is cut when encrypted;

sequentially generating the same keys as those generated by one of the first communication apparatus and the second communication apparatus;

decrypting the encrypted cut data with the key used when encrypting the encrypted cut data and the same algorithm as the algorithm to render it as the transmission subject cut data; and connecting the decrypted transmission subject cut data to render it as the transmission subject data, and one and the other of the first communication apparatus and the second communication apparatus generate the key each time the transmission subject data is encrypted or the encrypted data is decrypted, and use a predetermined solution obtained by assigning at least one of past solutions to a solution generating algorithm in the case of generating the key and also erase the past solutions when it is no longer necessary to assign them anew.

* * * * *